US012696062B2

(12) United States Patent (10) Patent No.: US 12,696,062 B2
Thanayankizil et al. (45) Date of Patent: Jul. 28, 2026

(54) SYSTEM AND METHOD FOR DISTRIBUTED COEXISTENCE AND SOFT MITIGATION THROUGH A VEHICLE NETWORK FOR IN-VEHICLE MODULES

(71) Applicant: GM Global Technology Operations LLC, Detroit, MI (US)

(72) Inventors: Lakshmi V. Thanayankizil, Troy, MI (US); Aaron Adler, Rochester Hills, MI (US); Nahel Eshaq, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 277 days.

(21) Appl. No.: 18/495,359

(22) Filed: Oct. 26, 2023

(65) Prior Publication Data

US 2025/0142307 A1     May 1, 2025

(51) Int. Cl.
*H04W 4/80* (2018.01)
*H04W 84/12* (2009.01)

(52) U.S. Cl.
CPC .............. *H04W 4/80* (2018.02); *H04W 84/12* (2013.01)

(58) Field of Classification Search
CPC .......... H04W 4/80; H04W 84/12; H04W 4/40
See application file for complete search history.

(56) References Cited

U.S. PATENT DOCUMENTS

| | | | | |
|---|---|---|---|---|
| 2012/0207032 A1* | 8/2012 | Chen | ...................... | H04W 28/04 |
| | | | | 370/252 |
| 2016/0112947 A1* | 4/2016 | Sahoo | ..................... | H04W 4/80 |
| | | | | 370/311 |
| 2016/0262056 A1* | 9/2016 | Chen | ........................ | H04W 4/80 |
| 2021/0227603 A1* | 7/2021 | Ahn | .......................... | H04W 4/80 |
| 2022/0085899 A1* | 3/2022 | Vukovic | ............... | H04W 76/11 |
| 2022/0104141 A1* | 3/2022 | Kondareddy | ....... | H04W 52/288 |
| 2022/0210735 A1* | 6/2022 | Narula | .................. | H04L 1/0071 |
| 2023/0087730 A1* | 3/2023 | Narula | .................. | H04W 48/16 |
| | | | | 455/41.2 |
| 2025/0212278 A1* | 6/2025 | Min | .................. | H04W 52/0274 |
| 2025/0246035 A1* | 7/2025 | Furtwaengler | .......... | B60R 25/24 |

FOREIGN PATENT DOCUMENTS

KR       20140052423 A       5/2014

* cited by examiner

*Primary Examiner* — Afshawn M Towfighi
(74) *Attorney, Agent, or Firm* — Honigman LLP; Matthew H. Szalach

(57)       ABSTRACT

A vehicle comprises a Wi-Fi network including at least one Wi-Fi antenna module including a Wi-Fi antenna in communication with a Wi-Fi Integrated Circuit (IC) and a Bluetooth Low Energy (BLE) network including at least one BLE antenna module including a BLE antenna and a BLE IC, the BLE IC configured to detect in-band noise, characterize the in-band noise, and transmit the characterization of the in-band noise to the Wi-Fi IC.

17 Claims, 3 Drawing Sheets

SYSTEM AND METHOD FOR DISTRIBUTED COEXISTENCE AND SOFT MITIGATION THROUGH A VEHICLE NETWORK FOR IN-VEHICLE MODULES

INTRODUCTION

The information provided in this section is for the purpose of generally presenting the context of the disclosure. Work of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to vehicle networks and, more particularly, to a system and method for employing soft mitigation techniques to permit simultaneous use of multiple networks.

Modern vehicles are required to employ networks that allow a vehicle to communicate with external devices, other vehicles, and remote servers. Such communication allows the vehicle to receive software updates, communicate vehicle diagnostics data to a remote server and/or a cloud-based computer, and receive and send signals to a user device to allow the user to remotely start the vehicle, lock and unlock vehicle doors, and monitor the current status of the vehicle (i.e., parked location, mileage, fuel or charge level, etc.). Additionally, such networks also provide for communication within a cabin of the vehicle. For example, internal networks often provide local Wi-Fi™ hotspots for use by vehicle occupants as well as connectivity for external devices such as cellular phones, tablets, and/or speakers.

Conventional networks adequately provide for external communication between the vehicle and/or vehicle occupants and external networks and systems. These networks also adequately provide for internal communication within the vehicle by providing vehicle occupants with the ability to connect external devices to vehicle systems. While such conventional networks adequately provide for internal and external communication, such networks cannot typically be used in conjunction with one another. For example, a Wi-Fi network, a Bluetooth Low Energy™ (BLE) network, and an Ultra Wideband (ULB) network will often interfere with one another, as these networks operate in the same or nearby frequency bands.

In conventional systems, when multiple networks are operating at the same time, a so-called hard mitigation is performed, whereby one of the networks is turned OFF to permit the remaining network to function without interference. While performing a hard mitigation allows one of the networks to function properly, it completely shuts down one or more other networks, thereby preventing operation of functions that run on these networks. Accordingly, a need remains for a system that provides for simultaneous operation of multiple vehicle networks to ensure that all vehicle functions can be properly performed at any given time.

SUMMARY

A vehicle is provided and comprises a Wi-Fi network including at least one Wi-Fi antenna module including a Wi-Fi antenna in communication with a Wi-Fi Integrated Circuit (IC) and a Bluetooth Low Energy (BLE) network including at least one BLE antenna module including a BLE antenna and a BLE IC, the BLE IC is configured to detect in-band noise, characterize the in-band noise, and transmit the characterization of the in-band noise to the Wi-Fi IC.

The vehicle may include one or more of the following optional features. For example, the Wi-Fi IC may be configured to determine whether the in-band noise is generated by the Wi-Fi network. Further, the Wi-Fi IC may be configured to determine a corrective action to reduce the in-band noise if the Wi-Fi IC determines that the in-band noise is generated by the Wi-Fi network. The corrective action may include at least one of switching a band or channel of the Wi-Fi network, switching from a Multiple Input Multiple Output (MIMO) state having more than one active Wi-Fi antenna to a Single Input Single Output (SISO) state having one active Wi-Fi antenna, and/or lowering a Tx power of signals transmitted by the Wi-Fi network.

In one configuration, the corrective action taken by the Wi-Fi IC may be communicated to a control module having memory hardware, the memory hardware storing the corrective action for future use by the Wi-Fi IC in mitigating in-band noise caused by the Wi-Fi network.

The BLE IC may be configured to remove the in-band noise by changing a frequency and/or a bandwidth of the BLE network if the Wi-Fi IC determines that the in-band noise is not generated by the Wi-Fi network.

An Ultra Wideband (UWB) network may be provided and may include at least one UWB antenna module having a UWB antenna and a UWB IC. The UWB IC may be in communication with the BLE IC and the Wi-Fi IC. Additionally or alternatively, the UWB IC may be configured to remove the in-band noise by changing a frequency and/or a bandwidth of the UWB network if the Wi-Fi IC determines that the in-band noise is not generated by the Wi-Fi network.

In one configuration, the Wi-Fi antenna may be a passive antenna.

In another configuration, a vehicle is provided and comprises a Wi-Fi network including at least one Wi-Fi antenna module including a Wi-Fi antenna in communication with a Wi-Fi Integrated Circuit (IC) and an Ultra Wideband (UWB) network including at least one UWB antenna module having a UWB antenna and a UWB IC, the UWB IC is configured to detect in-band noise, characterize the in-band noise, and transmit the characterization of the in-band noise to the Wi-Fi IC.

The vehicle may include one or more of the following optional features. For example, the Wi-Fi IC may be configured to determine whether the in-band noise is generated by the Wi-Fi network. Further, the Wi-Fi IC may be configured to determine a corrective action to reduce the in-band noise if the Wi-Fi IC determines that the in-band noise is generated by the Wi-Fi network. The corrective action may include at least one of switching a band or channel of the Wi-Fi network, switching from a Multiple Input Multiple Output (MIMO) state having more than one active Wi-Fi antenna to a Single Input Single Output (SISO) state having one active Wi-Fi antenna, and/or lowering a Tx power of signals transmitted by the Wi-Fi network.

In one configuration, the corrective action taken by the Wi-Fi IC may be communicated to a control module having memory hardware, the memory hardware storing the corrective action for future use by the Wi-Fi IC in mitigating in-band noise caused by the Wi-Fi network.

The UWB IC may be configured to remove the in-band noise by changing a frequency and/or a bandwidth of the UWB network if the Wi-Fi IC determines that the in-band noise is not generated by the Wi-Fi network.

In yet another configuration, a vehicle is provided and comprises a Bluetooth Low Energy (BLE) network including at least one BLE antenna module including a BLE antenna and a BLE Integrated Circuit (IC), an Ultra Wideband (UWB) network including at least one UWB antenna module having a UWB antenna and a UWB IC, the UWB IC in communication with the BLE IC, and a Wi-Fi network including at least one Wi-Fi antenna module including a Wi-Fi antenna in communication with a Wi-Fi IC, the Wi-Fi IC in communication with the BLE IC and the UWB IC, configured to determine whether detected in-band noise is caused by the Wi-Fi network, and to reduce the detected in-band noise by taking a corrective action if the Wi-Fi IC determines that the in-band noise is generated by the Wi-Fi network.

The vehicle may include one or more of the following optional features. For example, at least one of the BLE IC and the UWB IC may be configured to detect the in-band noise, characterize the in-band noise, and transmit the characterization of the in-band noise to the Wi-Fi IC for use by the Wi-Fi IC in determining whether the in-band noise is generated by the Wi-Fi network. Additionally or alternatively, at least one of the BLE IC or the UWB IC may be configured to remove the in-band noise by changing a frequency and/or a bandwidth of the BLE network or the UWB network, respectively, if the Wi-Fi IC determines that the in-band noise is not generated by the Wi-Fi network.

In one configuration, the corrective action may include at least one of switching a band or channel of the Wi-Fi network, switching from a Multiple Input Multiple Output (MIMO) state having more than one active Wi-Fi antenna to a Single Input Single Output (SISO) state having one active Wi-Fi antenna, and/or lowering a Tx power of signals transmitted by the Wi-Fi network.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
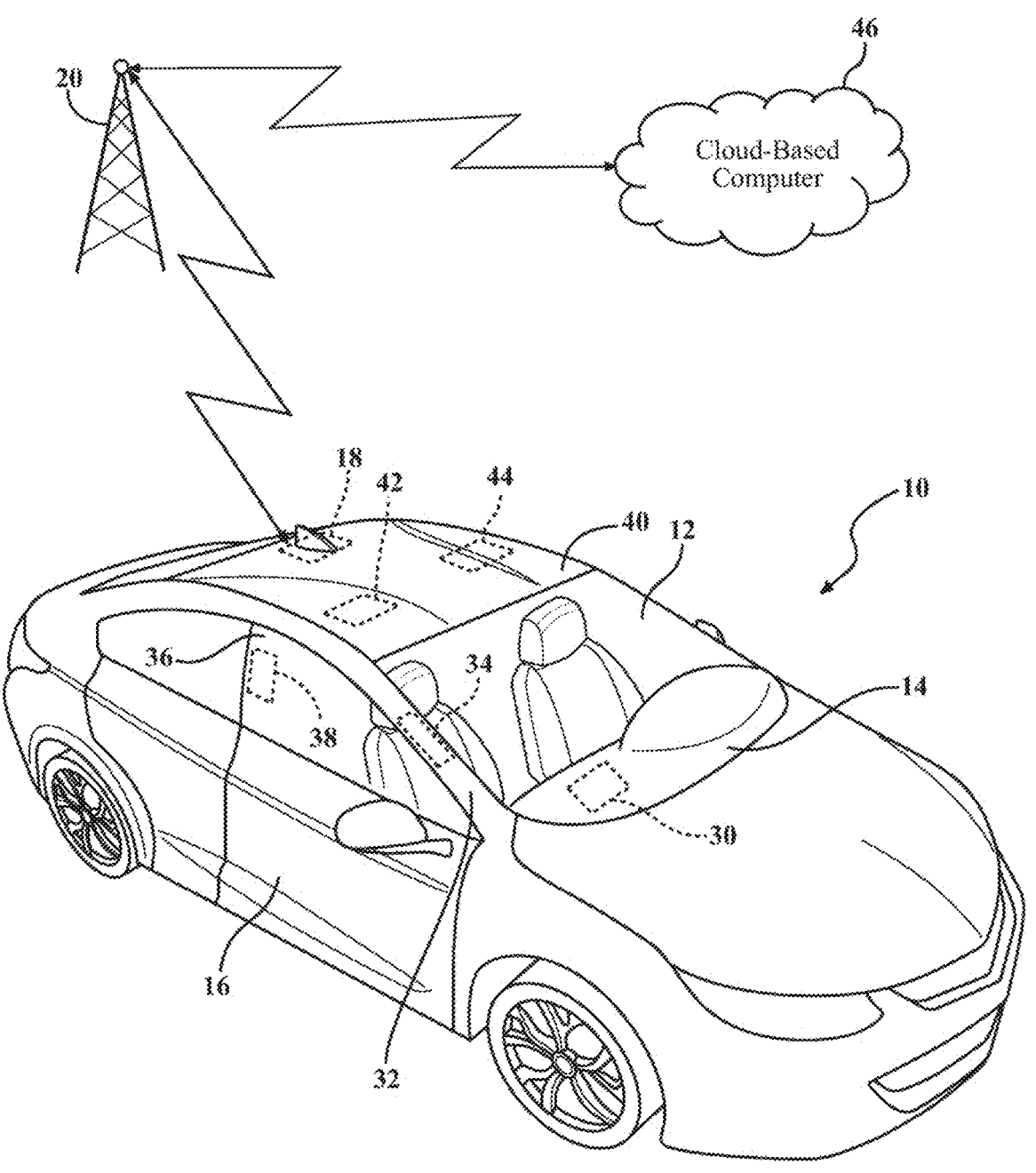
FIG. 1 is a perspective view of a vehicle incorporating a distributed coexistence system in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

With reference to FIG. 1, a vehicle 10 is provided and includes a vehicle cabin 12, an instrument panel (IP) 14 located within the vehicle cabin 12, and a pair of doors 16 that provide for selective access to the vehicle cabin 12. The vehicle 10 may be an electric vehicle (EV) powered by one or more electric motors (none shown), a hybrid electric vehicle (HEV) powered by one or more electric motors in conjunction with an internal combustion engine (ICE), or may be powered solely by an ICE.

Figure 2:
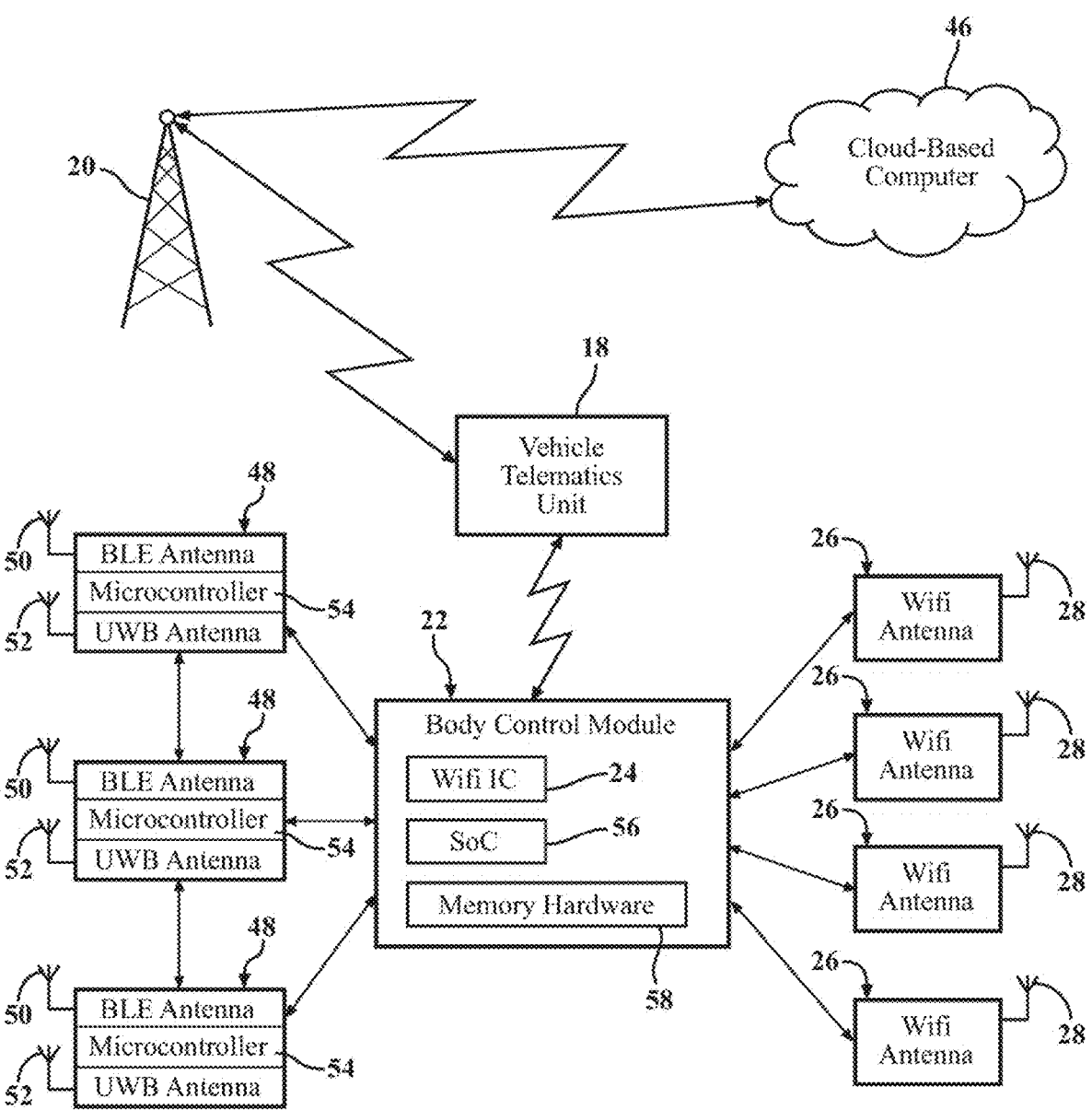
FIG. 2 is a functional block diagram showing a body control module in communication with a vehicle telematics unit, a plurality of antenna modules, and a cloud-based computer, the body control module configured to store and execute the distributed coexistence system of FIG. 1.

The vehicle 10 additionally includes a series of networks that provide for external and internal communication. For example, the vehicle 10 may include a Wi-Fi™ network, a Bluetooth Low Energy™ (BLE) network, and an Ultra Wideband (UWB) network that function to provide for external and/or internal communication during operation of the vehicle 10. For example, the vehicle 10 may include a vehicle telematics unit 18 (FIG. 2) that is in communication with a cellular tower 20. While the vehicle telematics unit 18 is shown in FIG. 2 as being in communication with a single cellular tower 20, the vehicle telematics unit 18 could be in communication with more than one cellular tower 20 and, further, may be in communication with different cellular towers 20 during movement of the vehicle 10.

Communication between the vehicle telematics unit 18 and the cellular tower 20 allows the vehicle 10 to receive and communicate data with a cellular network via the vehicle telematics unit 18 and the cellular tower 20. In so doing, the Wi-Fi network may receive data from and provide data to the vehicle telematics unit 18 during operation of the vehicle 10 to permit vehicle occupants to receive data from and send data to the cellular network. Specifically, a body control module (BCM) 22 of the vehicle 10 may be in communication with the vehicle telematics unit 18 and may include a Wi-Fi integrated circuit (IC) 24. The Wi-Fi IC 24 may be in communication with Wi-Fi antenna modules 26 located at various locations of the vehicle 10 and comprises a microprocessor. The Wi-Fi antenna modules 26 may receive data from and/or transmit data to vehicle occupants, as will be described in detail below.

The Wi-Fi antenna modules 26 are shown as including a Wi-Fi antenna 28 and may be located at any location of the vehicle 10 where communication with a cellular network is required. For example, a Wi-Fi antenna module 26 may be located within the IP 14 at a first location 30. Additionally or alternatively, a Wi-Fi antenna module 26 may be located within an A-pillar 32 of the vehicle 10 at a second location 34, may be located within a B-pillar 36 of the vehicle 10 at a third location 38, or may be located within a headliner (not shown) of the vehicle 10 proximate to a vehicle roof 40 at a fourth location 42 or a fifth location 44.

The Wi-Fi antenna 28 of the Wi-Fi antenna modules 26 are shown as being passive antennas. As such, none of the Wi-Fi antennas 28 are powered and none are controlled at the various locations 30, 34, 38, 42, 44. Rather, the Wi-Fi IC 24 of the BCM 22 controls each of the Wi-Fi antenna modules 26. Specifically, if the vehicle 10 includes two Wi-Fi antenna modules 26, the two Wi-Fi antenna modules 26 and the associated Wi-Fi antennas 28 are controlled by the Wi-Fi IC 24. Control of the Wi-Fi modules 26 by the Wi-Fi IC 24 may be accomplished by establishing a wired connection between each module 26 and the BCM 22. In one example, communication between the Wi-Fi modules 26 and the BCM 22 and, thus, the Wi-Fi IC 24, may be accomplished by a Controller Area Network (CAN) bus (not shown). While the Wi-Fi antenna modules 26 are shown as being passive and as being controlled by a Wi-Fi IC 24 associated with the BCM 22, one or more of the Wi-Fi modules 26 could include a dedicated integrated circuit (IC) including a microprocessor. In such a configuration, the Wi-Fi modules 26 having a dedicated IC would be controlled by the dedicated IC which, in turn, would be in communication with the BCM 22.

The Wi-Fi antenna modules 26 receive and transmit data at the Wi-Fi antennas 28 associated with each module 26. Specifically, the antennas 28 either receive data from the vehicle telematics unit 18 for distribution to a vehicle occupant or receive data from a vehicle occupant for transmission to the vehicle telematics unit 18. As previously described, the vehicle telematics unit 18 is in communication with a cellular network via the cellular tower 20 and, as such, serves as a bridge between each Wi-Fi antenna 28 and the cellular network. The data received from and transmitted to vehicle occupants may be received from and transmitted to an external device such as a cellular phone or tablet associated with the vehicle occupant.

In addition to receiving and transmitting cellular data to vehicle occupants, the Wi-Fi antenna modules 26 may also receive software updates for the vehicle 10, may transmit historical operational data regarding the vehicle 10 to a cloud-based computer 46, and may communicate with a Global Positioning System (GPS) to receive and transmit data regarding a location of the vehicle 10. The foregoing list is not exhaustive and may additionally include any data for use by the vehicle 10, by vehicle systems, or by vehicle occupants. For example, the Wi-Fi antenna modules 26 may receive weather data, radio signals, audio files, video files, etc. Regardless of the type of data transmitted to or from the vehicle 10 via the Wi-Fi antenna modules 26, the data is transmitted to or from the Wi-Fi antennal modules 26 via the vehicle telematics unit 18 and the cellular network via one or more cellular towers 20.

With continued reference to FIG. 2, the BCM 22 is shown as being in communication with BLE/UWB antenna modules 48. The BLE/UWB antenna modules 48 may be located in any of the first location 30, the second location 34, the third location 38, the fourth location 42, and the fifth location 44. In the present example, the BCM is shown as being in communication with three (3) BLE/UWB antenna modules 48. As with the Wi-Fi modules 26, the BCM 22 could be in communication with any number of BLE/UWB antenna modules 48. In the present example, the BCM 22 is shown in communication with three (3) BLE/UWB antenna modules 48 and four (4) Wi-Fi antenna modules 26. As only five (5) locations 30, 34, 38, 42, 44 are disclosed in this example, one or more of the BLE/UWB antenna modules 48 and the Wi-Fi antenna modules 26 may be located in the same location 30, 34, 38, 42, 44 or at a location proximate to the locations 30, 34, 38, 42, 44.

Each BLE/UWB antenna module 48 includes a BLE antenna 50, a UWB antenna 52, and an integrated circuit (IC) 54 that controls the BLE antenna 50 and the UWB antenna 52. These modules 48 may be referred to as an "anchor" (FIG. 3) due to the modules 48 incorporating an IC 54 that comprises a microprocessor. While the BLE/UWB antenna modules 48 are shown as including a single IC 54 that controls the BLE antenna 50 and the UWB antenna 52, each of the BLE antenna 50 and the UWB antenna 52 could include a dedicated IC or, alternatively, the BLE antenna 50 and the UWB antenna 52 could be controlled by an IC associated with the BCM 22, as described above with respect to the WI-FI antenna modules 26. Regardless of whether the BLE/UWB modules 48 include zero (0), one (1) or two (2) ICs 54, communication between the BLE/UWB modules 48 and the BCM 22 may be accomplished by establishing a wired connection between each module 48 and the BCM 22. In one example, communication between the BLE/UWB modules 48 and the BCM 22 and may be accomplished by the CAN bus described above with respect to the Wi-Fi antenna modules 26. Finally, each of the Wi-Fi IC 24, the BLE IC 54, and the UWB IC 54 (if separate from the BLE IC 54) are in communication with one another.

The BLE network and the UWB network are low-energy networks and are used for short-range, high bandwidth communications. In the case of the vehicle 10, the BLE network and the UWB network may be used for passive entry, remote starting of the vehicle 10, remote unlocking and locking of the vehicle doors 16, localization of an external device such as a cellular phone or tablet within the vehicle cabin 12, or for ranging. In the case of passive entry, remote start, and unlocking/locking of the vehicle doors 16, the BLE network and/or the UWB network may establish a connection between a key fob (not shown) and/or a user device such as a cellular phone carried by a user and the BCM 22. Specifically, when a signal to unlock a door 16 is transmitted from a key fob, for example, the signal may be detected by one of the BLE antennas 50 and the UWB antennas 52. The antenna 50, 52 receiving the signal will transmit the instruction (i.e., to unlock a door 16) to the BCM 22 for use by the BCM 22 in unlocking the door 16. Specifically, the IC 54 associated with the BLE/UWB antenna module 48 that received the unlock instruction from the key fob will transmit the instruction to a System on Chip (SOC) 56 of the Body Control Module 22. The SOC 56 will send an unlock signal to the door 16 to unlock a lock (not shown) associated with the door 16.

The Wi-Fi network, the BLE network, and the UWB network are all associated with the vehicle 10 and perform functions and/or control vehicle functions that must operate simultaneously. Accordingly, these networks often need to perform functions at the same time. As described, the BLE network and UWB network are low-energy networks that perform short-range tasks in and around the vehicle 10. The Wi-Fi network, on the other hand, performs tasks that consume higher power and bandwidth such as communication of data to and from a cellular network. Because the Wi-Fi network, the BLE network, and the UWB network all function in the same or nearby frequency bands (i.e., the 2.4 GHz band or the 5 GHz/6 GHz band), utilizing two or more of these networks may result in one or more of the networks experiencing noise caused by one or more of the other networks.

The BCM 22 and, more specifically, the Wi-Fi IC 24 and the individual ICs 54 associated with the BLE/UWB modules 48, communicate with one another using an in-vehicle communication network such as the CAN bus to determine which network(s) needs to make an adjustment to reduce the noise caused by two or more of the networks operating simultaneously. In so doing, the Wi-Fi IC 24 and the individual ICs 54 associated with the BLE/UWB modules 48 communicate with one another to mitigate only the amount of noise necessary to allow the Wi-Fi network, the BLE network, and the UWB network to coexist and function at the same time. Accordingly, the Wi-Fi IC 24 and the individual ICs 54 cooperate to provide the vehicle 10 with a distributed coexistence system that allows these networks to coexist with one another.

As will be described below, one or more of the ICs 24, 54 and/or the BCM 22 may determine a corrective action to mitigate the noise associated with simultaneous operation of the Wi-Fi network, the BLE network, and the UWB network. The corrective action may include switching a band or channel of one or more of the networks, switching from a Multiple Input Multiple Output (MIMO) state where multiple antennas 28 are used to Single Input Single Output (SISO) state where only one antenna 28 is used, and/or reducing the Tx power (i.e., the strength of a transmitted signal) of the Wi-Fi network.

Figure 3:
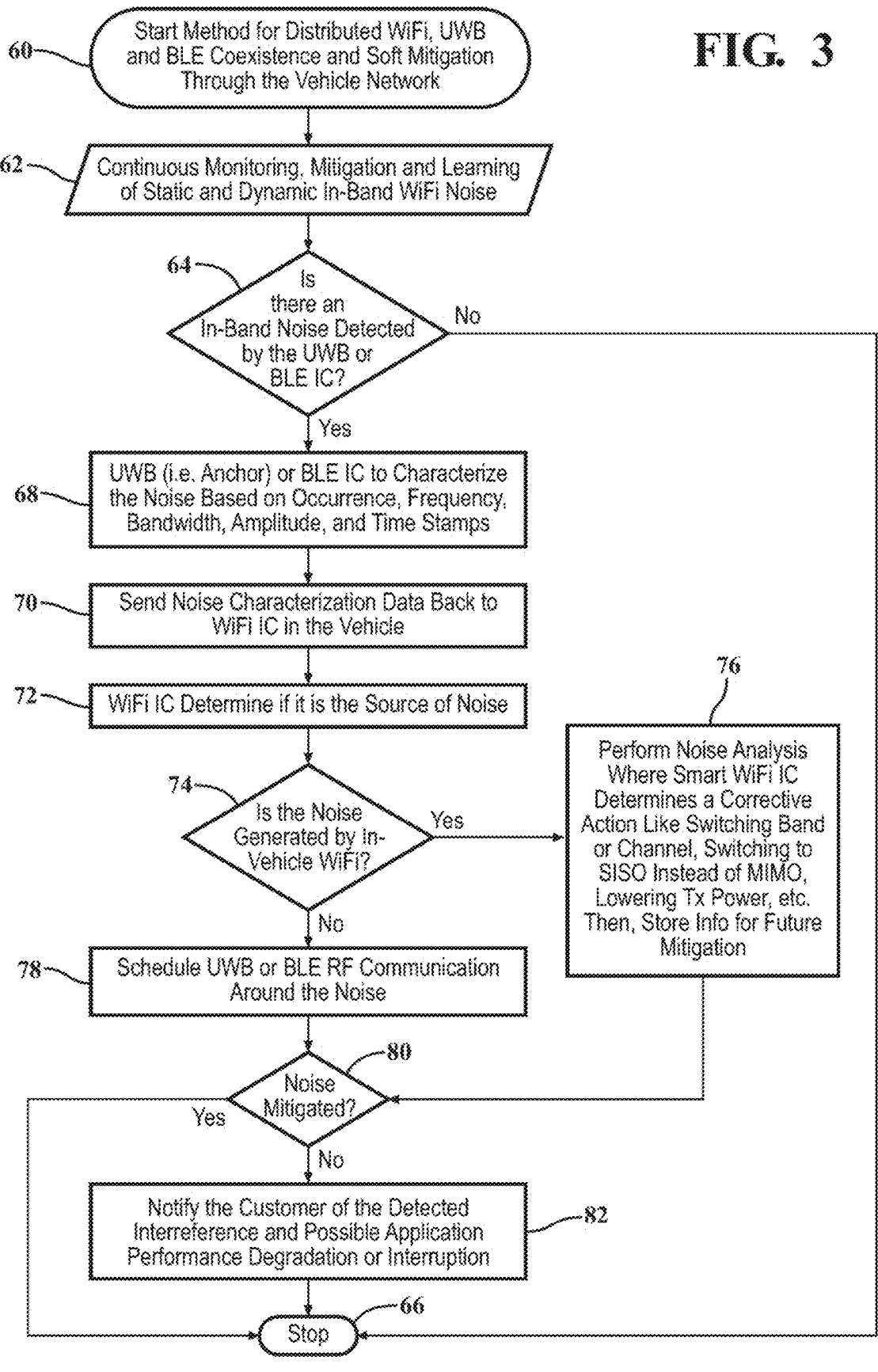
FIG. 3 is a flowchart detailing operation of the distributed coexistence system of FIG. 1.

With particular reference to FIG. 3, a flowchart is provided and details how the ICs 24, 54 and/or the BCM 22 mitigate noise caused by simultaneous operation of one or more of the Wi-Fi network, the BLE network, and the UWB network. If the BCM 22 performs any or all of the steps shown in FIG. 3, the instructions for performing the steps may be stored on memory hardware 58.

The method starts at 60. At 62, the Wi-Fi network, the BLE network, and the UWB network are continuously monitored by the ICs 24, 54 and/or the BCM 22. Further, the ICs 24, 54 and/or the BCM 22 performs a learning function to better determine the presence of static and dynamic in-band Wi-Fi noise. Static Wi-Fi noise is defined as Wi-Fi noise occurring when the vehicle 10 is not moving while dynamic Wi-Fi noise is defined as Wi-Fi noise occurring when the vehicle 10 is moving.

At 64, a determination is made with respect to whether in-band noise is detected by the BLE/UWB IC 54. If not, the operations stop at 66. If in-band noise is detected by the BLE/UWB IC 54, the BLE/UWB IC 54 characterizes the in-band noise based on occurrence, frequency, bandwidth, amplitude, and time stamps at 68. At 70, the noise characterization performed by the BLE/UWB IC 54 is sent to the Wi-Fi IC 24. The Wi-Fi IC 24 determines whether the Wi-Fi network is the cause of the noise at 72. Specifically, the Wi-Fi IC 24 determines if the in-band noise is generated by in-vehicle Wi-Fi at 74. If so, the Wi-Fi IC 24 performs a noise analysis where the Wi-Fi IC 24 determines a corrective action such as switching a band or channel, switching to SISO from MIMO, and/or lowering the Tx power at 76. Further, the Wi-Fi IC 24 may then store the corrective action as well as the conditions requiring the corrective action in the memory hardware 58 at 76 to allow the Wi-Fi IC 24 to learn and improve over time. Further, this information may be communicated to the cloud-based computer 46 via the vehicle telematics unit 18 and the cellular network.

If the in-band noise is not determined to be generated by in-vehicle Wi-Fi at 74, the IC 54 and/or the BCM 22 may schedule the frequencies of the BLE communications or the UWB communications around the noise at 78. If the noise is mitigated at 80—either due to the corrective actions taken at 76 or by the IC 54 and/or the BCM 22 scheduling frequencies of the BLE communications or the UWB communications around the noise—the method stops at 66. If the noise is not mitigated at 80, the BCM 22 may notify the vehicle occupant(s) of the detected interference (i.e., noise) at 82 to alert the vehicle occupant(s) of possible application performance degradation or interruption. After the notification is issued at 80, the method stops at 66.

As described, the system and method of the present disclosure mitigates only that noise, which is required to allow the Wi-Fi network, the BLE network, and the UWB network to simultaneously function without having to completely shut down the BLE network or the UWB network. For example, if the BLE/UWB IC 54 sees noise from a Wi-Fi radio in the 40 MHz band, the IC 54 will notify the Wi-Fi IC 24 of the noise it sees. If the Wi-Fi radio is not currently being used, the Wi-Fi IC 24 may update the bandwidth (BW) to a lower BW to exclude the 40 MHz band. Alternatively, the Wi-Fi IC 24 may reduce the power of the Wi-Fi radio by an amount equal to the added noise. If, on the other hand, the Wi-Fi radio is currently in use, the Wi-Fi IC 24 will notify the BLE/UWB IC 54, which will mitigate 20 MHz of the noise. The Wi-Fi IC 24 will then update the BW of the Wi-Fi radio to remove the remaining 20 MHz of noise. In so doing, the Wi-Fi IC 24 and the BLE/UWB IC 54 communicate with one another and cooperate to reduce or eliminate the detected noise without having to completely shut down a device or network. Such wireless communication amongst the various ICs 24, 54 allows the ICs 24, 54 to only mitigate that noise which is required, and prevents having to shut down a device or network completely.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
a controller area network (CAN) bus;
a Wi-Fi network including at least one Wi-Fi antenna module including a Wi-Fi antenna in communication with a Wi-Fi Integrated Circuit (IC); and
a Bluetooth Low Energy (BLE) network including at least one BLE antenna module including a BLE antenna and a BLE IC, the BLE IC communicatively coupled to the Wi-Fi IC via the CAN bus and configured to:
detect in-band noise;
determine a characterization of the in-band noise, wherein the characterization comprises at least one of an occurrence, a frequency, a bandwidth, an amplitude, or a time stamp of the in-band noise; and
transmit the characterization of the in-band noise to the Wi-Fi IC over the CAN bus,
wherein the Wi-Fi IC is configured to:
determine, based on the characterization of the in-band noise determined by the BLE IC, whether the in-band noise was generated by the Wi-Fi network; and
based on determining that the in-band noise was generated by the Wi-Fi network, adjust the Wi-Fi network to reduce the in-band noise generated by the Wi-Fi network.

2. The vehicle of claim 1, wherein the Wi-Fi IC is configured to determine a corrective action to reduce the in-band noise if the Wi-Fi IC determines that the in-band noise is generated by the Wi-Fi network.

3. The vehicle of claim 2, wherein the corrective action includes at least one of switching a band or channel of the Wi-Fi network, switching from a Multiple Input Multiple Output (MIMO) state having more than one active Wi-Fi antenna to a Single Input Single Output (SISO) state having one active Wi-Fi antenna, and/or lowering a Tx power of signals transmitted by the Wi-Fi network.

4. The vehicle of claim 2, further comprising communicating the corrective action taken by the Wi-Fi IC to a control module having memory hardware, the memory hardware storing the corrective action for future use by the Wi-Fi IC in mitigating in-band noise caused by the Wi-Fi network.

5. The vehicle of claim 1, wherein the BLE IC is configured to remove the in-band noise by changing a frequency and/or a bandwidth of the BLE network if the Wi-Fi IC determines that the in-band noise is not generated by the Wi-Fi network.

6. The vehicle of claim 1, further comprising an Ultra Wideband (UWB) network including at least one UWB antenna module having a UWB antenna and a UWB IC.

7. The vehicle of claim 6, wherein the UWB IC is in communication with the BLE IC and the Wi-Fi IC.

8. The vehicle of claim 7, wherein the UWB IC is configured to remove the in-band noise by changing a frequency and/or a bandwidth of the UWB network if the Wi-Fi IC determines that the in-band noise is not generated by the Wi-Fi network.

9. The vehicle of claim 1, wherein the Wi-Fi antenna is a passive antenna.

10. A vehicle comprising:
a controller area network (CAN) bus;
a Wi-Fi network including at least one Wi-Fi antenna module including a Wi-Fi antenna in communication with a Wi-Fi Integrated Circuit (IC); and
an Ultra Wideband (UWB) network including at least one UWB antenna module having a UWB antenna and a UWB IC, the UWB IC communicatively coupled to the Wi-Fi IC via the CAN bus and configured to:
detect in-band noise;
determine a characterization of the in-band noise, wherein the characterization comprises at least one of an occurrence, a frequency, a bandwidth, an amplitude, or a time stamp of the in-band noise; and
transmit the characterization of the in-band noise to the Wi-Fi IC over the CAN bus,
wherein the Wi-Fi IC is configured to:
determine, based on the characterization of the in-band noise determined by the UWB IC, whether the in-band noise was generated by the Wi-Fi network; and
based on determining that the in-band noise was generated by the Wi-Fi network, adjust the Wi-Fi network to reduce the in-band noise generated by the Wi-Fi network.

11. The vehicle of claim 10, wherein the Wi-Fi IC is configured to determine a corrective action to reduce the in-band noise if the Wi-Fi IC determines that the in-band noise is generated by the Wi-Fi network.

12. The vehicle of claim 11, wherein the corrective action includes at least one of switching a band or channel of the Wi-Fi network, switching from a Multiple Input Multiple Output (MIMO) state having more than one active Wi-Fi antenna to a Single Input Single Output (SISO) state having one active Wi-Fi antenna, and/or lowering a Tx power of signals transmitted by the Wi-Fi network.

13. The vehicle of claim 11, further comprising communicating the corrective action taken by the Wi-Fi IC to a control module having memory hardware, the memory hardware storing the corrective action for future use by the Wi-Fi IC in mitigating in-band noise caused by the Wi-Fi network.

14. The vehicle of claim 10, wherein the UWB IC is configured to remove the in-band noise by changing a frequency and/or a bandwidth of the UWB network if the Wi-Fi IC determines that the in-band noise is not generated by the Wi-Fi network.

15. A vehicle comprising:
a controller area network (CAN) bus;
a Bluetooth Low Energy (BLE) network including at least one BLE antenna module including a BLE antenna and a BLE Integrated Circuit (IC) configured to:
detect first in-band noise; and
determine a characterization of the first in-band noise, wherein the characterization of the first in-band noise comprises at least one of an occurrence, a frequency, a bandwidth, an amplitude, or a time stamp of the first in-band noise;
an Ultra Wideband (UWB) network including at least one UWB antenna module having a UWB antenna and a UWB IC configured to:
detect second in-band noise; and determine a characterization of the second in-band noise, wherein the characterization of the second in-band noise comprises at least one of an occurrence, a frequency, a bandwidth, an amplitude, or a time stamp of the second in-band noise; and a Wi-Fi network including at least one Wi-Fi antenna module including a Wi-Fi antenna in communication with a Wi-Fi IC, the Wi-Fi IC in communication with the BLE IC and the UWB IC via the CAN bus and configured to:

receive the characterization of the first in-band noise via the CAN bus;

receive the characterization of the second in-band noise via the CAN bus;

determine whether the first in-band noise or the second in-band noise was generated by the Wi-Fi network; and based on determining that the first in-band noise or the second in-band noise was generated by the Wi-Fi network, taking a corrective action to reduce the detected first in-band noise or the second in-band noise.

16. The vehicle of claim 15, wherein at least one of the BLE IC is configured to remove the first in-band noise or the UWB IC is configured to remove the second in-band noise by changing a frequency and/or a bandwidth of the BLE network or the UWB network, respectively, if the Wi-Fi IC determines that the first in-band noise or the second in-band noise was not generated by the Wi-Fi network.

17. The vehicle of claim 15, wherein the corrective action includes at least one of switching a band or channel of the Wi-Fi network, switching from a Multiple Input Multiple Output (MIMO) state having more than one active Wi-Fi antenna to a Single Input Single Output (SISO) state having one active Wi-Fi antenna, and/or lowering a Tx power of signals transmitted by the Wi-Fi network.

\* \* \* \* \*